United States Patent
Norrie et al.

(10) Patent No.: US 7,779,197 B1
(45) Date of Patent: Aug. 17, 2010

(54) DEVICE AND METHOD FOR ADDRESS MATCHING WITH POST MATCHING LIMIT CHECK AND NULLIFICATION

(75) Inventors: Christopher I. W. Norrie, San Jose, CA (US); Lambert Fong, San Ramon, CA (US)

(73) Assignee: Integrated Device Technology, Inc., San Jose, CA (US)

(*) Notice: Subject to any disclaimer, the term of this patent is extended or adjusted under 35 U.S.C. 154(b) by 1135 days.

(21) Appl. No.: 11/382,475

(22) Filed: May 9, 2006

(51) Int. Cl.
G06F 13/00 (2006.01)
(52) U.S. Cl. ............... 710/316; 710/317; 710/305
(58) Field of Classification Search ......... 710/316–317, 710/305–306
See application file for complete search history.

(56) References Cited

U.S. PATENT DOCUMENTS

| | | | |
|---|---|---|---|
| 4,638,431 A | 1/1987 | Nishimura |
| 4,641,302 A | 2/1987 | Miller |
| 4,727,480 A | 2/1988 | Albright et al. |
| 5,247,691 A | 9/1993 | Sakai |
| 5,706,460 A | 1/1998 | Craig et al. |
| 5,761,726 A | 6/1998 | Guttag et al. |
| 5,867,677 A | 2/1999 | Tsukamoto |
| 5,884,297 A | 3/1999 | Noven |
| 5,915,097 A | 6/1999 | Chao |
| 6,005,863 A | 12/1999 | Deng et al. |
| 6,378,047 B1 | 4/2002 | Meyer |
| 6,490,288 B1 | 12/2002 | Lin et al. |
| 6,539,536 B1 | 3/2003 | Singh et al. |
| 6,810,037 B1 | 10/2004 | Kalapathy et al. |
| 7,061,861 B1 | 6/2006 | Mekkittikul et al. |
| 7,124,200 B2 | 10/2006 | Sato et al. |
| 2001/0002907 A1 | 6/2001 | Jeong et al. |
| 2002/0009050 A1 | 1/2002 | Ueno |
| 2002/0087837 A1 | 7/2002 | Samra et al. |
| 2002/0194486 A1 | 12/2002 | Heinrich et al. |
| 2003/0023836 A1 | 1/2003 | Catherwood et al. |
| 2003/0126535 A1 | 7/2003 | Solomon et al. |
| 2004/0044798 A1 | 3/2004 | Elzur et al. |

(Continued)

OTHER PUBLICATIONS

Main, Data Structure & Other Objects Using Java, 1999, Addison-Wesley, pp. 526-529 and 575-582.

(Continued)

*Primary Examiner*—Mark Rinehart
*Assistant Examiner*—Kim T Huynh
(74) *Attorney, Agent, or Firm*—Michael R. Hardaway; Kenneth Glass; Glass & Associates

(57) ABSTRACT

A device and method are disclosed for performing a limit address check validation in a switching device. The device includes a data selector circuit that is enabled to select the content of an address register in an array of address registers, and a comparator electrically coupled to the data selector circuit and enabled to take a first input from the data selector circuit and target address as a second input from a communication packet. The method includes receiving the target address, seeking and locating a matching address in an array of base address registers, directing the packet to the port associated with the matching address, determining the target address to be a valid address by comparing the target address with a limit address associated with the matching base address, and nullifying the match if the target address is greater than the limit address.

18 Claims, 7 Drawing Sheets

U.S. PATENT DOCUMENTS

| | | |
|---|---|---|
| 2004/0162963 A1 | 8/2004 | Cedola |
| 2004/0202379 A1 | 10/2004 | Boskovic et al. |
| 2005/0220129 A1 | 10/2005 | Boyd |
| 2006/0114918 A1 | 6/2006 | Ikeda et al. |
| 2006/0117126 A1 | 6/2006 | Leung et al. |
| 2006/0174048 A1* | 8/2006 | Ohara et al. ............... 710/305 |
| 2006/0221954 A1 | 10/2006 | Naranyan et al. |
| 2006/0242352 A1 | 10/2006 | Torudbakken et al. |
| 2006/0253619 A1 | 11/2006 | Torudbakken et al. |
| 2007/0097948 A1 | 5/2007 | Boyd et al. |
| 2007/0097950 A1 | 5/2007 | Boyd et al. |
| 2007/0143395 A1 | 6/2007 | Uehara et al. |
| 2007/0147359 A1 | 6/2007 | Congdon et al. |
| 2007/0183393 A1 | 8/2007 | Boyd et al. |
| 2007/0266179 A1 | 11/2007 | Chavan et al. |

OTHER PUBLICATIONS

PCE Express Base Specification, Mar. 2005, PCI Express, pp. 1-508.

Xilinx, Using Look-up tables as shift registers in Spartan-3 devices, Xilinx, 2003, pp. 1-18.

Mindahare et al., PCI Express System Architecture, Mindshare, 2003, Page numbers not available from electronic edition.

* cited by examiner

DEVICE AND METHOD FOR ADDRESS MATCHING WITH POST MATCHING LIMIT CHECK AND NULLIFICATION

BACKGROUND OF THE INVENTION

Peripheral Component Interconnect (PCI) Express is a third generation Input Output (3GIO) system that implements a serial, switched-packet, point-to-point communication standard at the system level. PCI Express has achieved many advantages over the prior shared bus system, such as quality of service (QoS), high speed peer-to-peer communication between external devices, adaptability, and low pin counts. The basic PCI Express architecture includes a root complex, a PCI Express switch chip, and various external devices. So far, PCI Express switching has only been implemented in a limited number of external devices.

One three-port PCI Express serial switch performs simultaneous comparisons of the target address value of an incoming data packet with the addresses of all possible directly-connected external devices. Since each external device's addressing is defined by a base address and a limit address, there are six comparisons performed for each port. Communication packets can arrive at any of the three ports, so as many as 18 comparisons can be required to be performed, in parallel, within the PCI Express switch, requiring the implementation of sufficient comparators to accomplish the simultaneous comparisons.

As a result of the need to couple more devices to PCI Express systems, there is a need for switches that can accommodate higher number of external devices. Thus, for example, for a PCI Express switch to accommodate 16 external devices, it would require 16 ports. For a PCI Express switch to have 16 ports or more, the total number of comparisons that would be needed using conventional switch architecture can be as many as 512, or more. Switches having 512 comparators are undesirable since comparators take up chip space, consume power, and increase latency of the system.

Thus, there is a need for a method and apparatus that will accommodate rapid address searching in support of connection of a large number of external devices to a serial switch without using an exponentially increased number of comparators and registers and achieving high performance at the same time.

SUMMARY OF THE INVENTION

A method for limit address checking is presented in order to support rapid address searching. The method is implemented in a PCI Express serial switch and accommodates a large number of ports without using the expected exponentially-increased number of comparators and registers. In addition, the device avoids simultaneous limit address checking with each base address comparison by delaying the limit check until the base address check is made.

A device and method are disclosed for performing a limit address check validation in a switching device. The device includes a data selector circuit that is enabled to select the content of an address register in an array of address registers, and a comparator electrically coupled to the data selector circuit and enabled to take a first input from the data selector circuit and target address as a second input from a communication packet. The method includes receiving the target address, seeking and locating a matching address in an array of base address registers, directing the packet to the port associated with the matching address, determining the target address to be a valid address by comparing the target address with a limit address associated with the matching base address, and nullifying the match if the target address is greater than the limit address.

By using a delayed limit address check, the method and apparatus of the present invention allow for quickly and accurately locating a matching address in a sorted list of base addresses in an array of base address registers. Also, the delayed limit address check of the present invention requires fewer comparators and registers than corresponding prior art systems, resulting in saving considerable semiconductor chip size and power consumption.

These and other advantages of the present invention will become obvious to those of ordinary skill in the art after having read the following detailed description of the preferred embodiments, which are illustrated in the various drawing figures.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
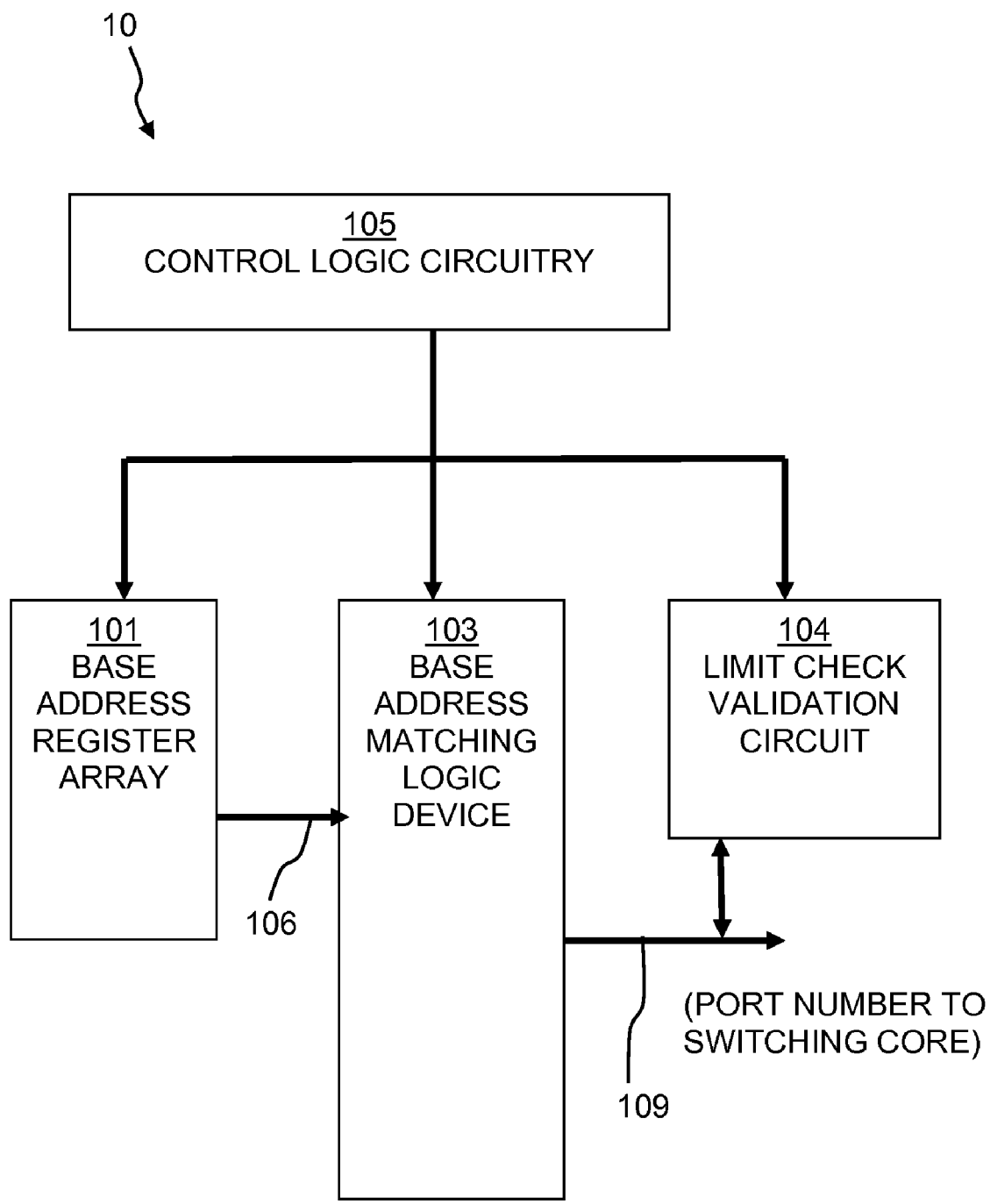
FIG. 1 illustrates a block diagram of a routing device for a multi-port switching device that includes control logic circuitry, a base address sorting device, a matching logic device, and an invalidation circuit in accordance with an embodiment of the present invention.

FIG. 1 illustrates a block diagram of a routing device for a PCI Express multi-port switch. Embodiments of the present invention are intended to function in a PCI Express switch that is enabled to sort base register addresses into an ascending or descending order.

In FIG. 1, routing device 10 includes control logic circuitry 105, a base address register array 101, a base address matching logic device 103, and an limit check validation circuit 104. In this embodiment of the present invention, routing device 10 is located at each port of the multi-port device to route a new communication packet into the correct port and thus to the correct external device. In the present embodiment, base address matching logic device 103 generates an output that is coupled to limit check validation circuit 104. Control logic circuitry 105 is electrically connected to and directs the functioning of base address register array 101, base address matching logic device 103, and limit check validation circuit 104.

It is noted here that this discussion of embodiments of the present invention refers to use in a Peripheral Component Interface Express (PCIe) switch operating as part of a PCI Express bus. However, implementation of embodiments of the present invention is not limited to such applications.

PCI Express communications, it is noted, are switched-packet serial communications, meaning that information communicated in PCI Express is contained in a packet that includes a header having an address and, if data is being communicated, a payload. Because a header is added at a transaction layer in the PCI Express structure, a packet containing data and a header is commonly referred to as a transaction layer packet (TLP).

It is also noted that a "base address register," as referred to in this description, denotes a register that holds a base address, a limit address, and a port identifier, either a port number or a port name. Since a bus number can also be used to route some types of packets in a PCI Express serial switch, a bus number can be included in the contents of a base address register.

In one implementation of a PCI Express switch, an array of base address registers, one register for each other port in a switching device, is assigned to each port connected to a device with which the PCI Express switch communicates. At each port in a three-port switch, for example, there are three base address registers for a total of nine. In a large port-count switch, such as one having sixteen ports, for example, each port has an array of sixteen base address registers, for a total of 256. Each base address register contains a port name and the base and limit addresses assigned to external devices connected, either directly or indirectly, to its named port. The array of base address registers is encountered by the routing of an incoming PCI Express packet and the incoming packet is directed to the identified port of the base address register whose address contents encompass the target address contained in the packet's header.

For a communication packet to be routed to a device by the switch, the address in the packet header must equal or lie between the base address and the limit address assigned to the port that is connected to the device. Each port in a PCI Express switch is connected to only one external device but an external device can be another switch or a bridge connected to additional devices.

A PCI Express switch, in this embodiment of the present invention, is able to dynamically reassign addresses and address ranges to the ports in the switch. One example of a reason to dynamically reassign addresses is a requirement by the operating system to increase a memory allocation, such as when a software application discovers a need for more memory space than was allocated to it at system start up.

Another example is a hot-switched occurrence, such as in the example of a One-GByte flash memory device being plugged into a USB port in place of a 256 MByte device, all while the associated computer is running. The base address and the limit address are, in this example, changed in the base address register associated with the USB port. The increased memory size in this example may require a limit address that is outside the range of addresses available above the existing base address. The base address must then be changed to an address with an associated address space sufficient to encompass the new allocation. Reassignment is accomplished with a configuration command packet.

Embodiments of the present invention are able to accommodate reassignment of addresses in the base address registers by the use of commands contained in configuration packets. A configuration packet, it is noted, is one of the various types of packets defined in PCI Express. The others include memory read/write, input/output read/write, and completions. Some types of packets that request an action, such as a base address reconfiguration, require a response that indicates completion of the action and a possible product of the action, such as data. A response can also be a system message.

It is noted here, again, that embodiments of the present invention enhance the performance of serial switches by enabling a rapid binary search of base addresses. The rapid binary search is enabled by the sorting of base addresses into a descending or ascending order. In one embodiment, the insertion of new base addresses and the subsequent sorting of the base addresses held in the base address registers is performed in the manner disclosed in co-pending U.S. patent application Ser. No. 11/395,918 entitled "METHOD AND DEVICE FOR BASE ADDRESS SORTING AND ENTRY INTO BASE ADDRESS REGISTERS", filed Mar. 31, 2006; and in co-pending U.S. patent application Ser. No. 11/382,480 entitled "BINARY BASE ADDRESS SORTING METHOD AND DEVICE WITH SHIFT VECTOR" and filed on even date herewith, both of which are hereby incorporated by reference in their totality.

In one embodiment of the present invention, when a configuration command packet containing a new base address intended for a base address register associated with a port arrives at the PCI Express switch, the new address is inserted into the correct slot and the array of base address registers is sorted in a predetermined order. During normal packet communication operations, base address matching logic device 103 uses the sorted list of base address registers to determine which external device is the intended target of each incoming packet containing a target address. A search for the proper base address register involves a comparison of the packet header target address and the base addresses contained in the base address registers. When the base address registers are sorted in descending order, for example, the first base address register encountered whose base address is smaller than the target address is the base address register of interest. This avoids a comparison of each incoming target address with every base address in every base address register.

Figure 2A:
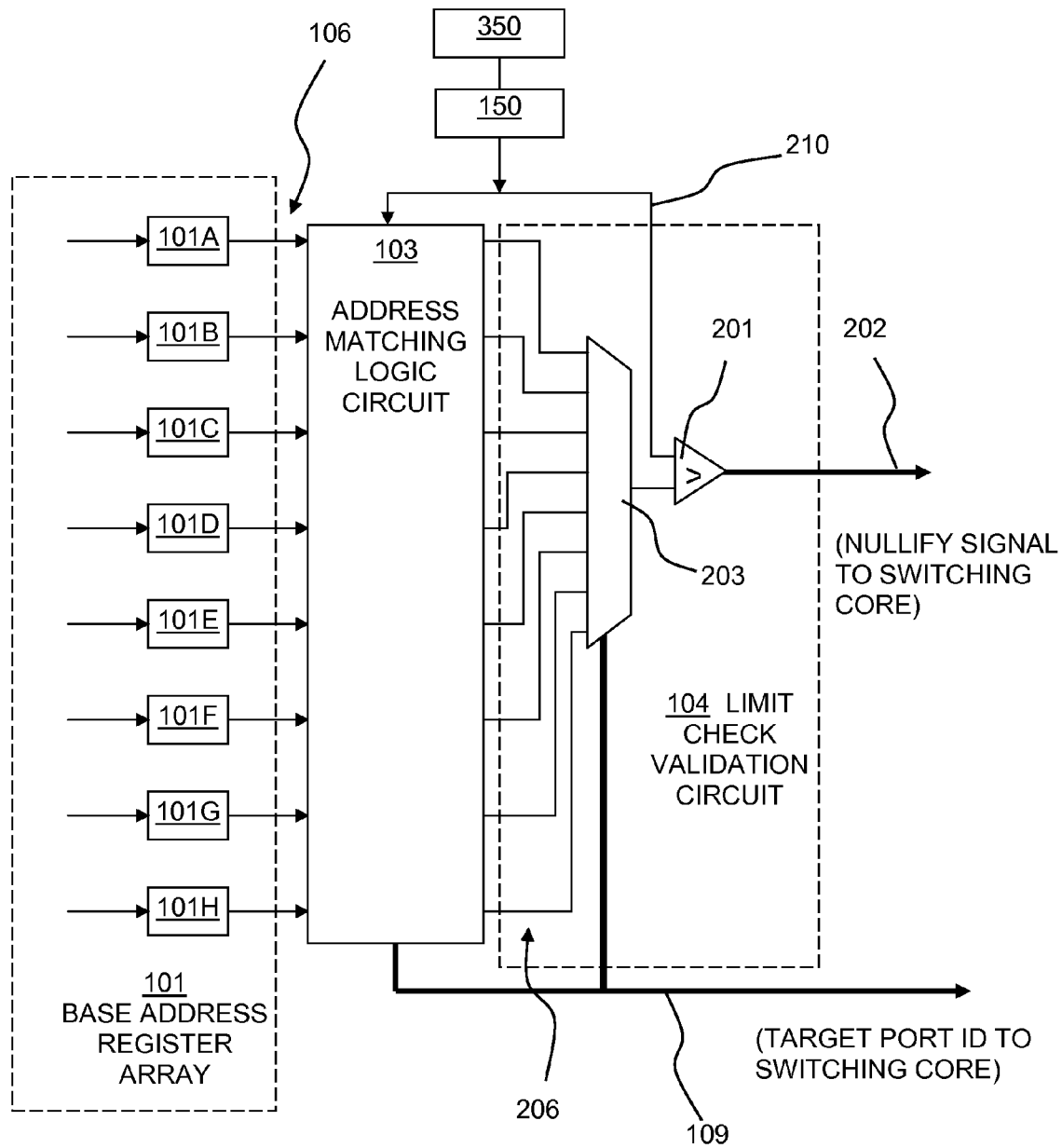
FIG. 2A illustrates a logical diagram of a limit check validation device in accordance with an embodiment of the present invention.

Referring now to FIG. 2A, routing device 10 is shown in more detail. In this embodiment of the present invention, routing device 10 includes base address register array 101, address matching logic circuit 103, and limit check validation circuit 104. Routing device 10 includes, in this embodiment, register/buffer 150 which is electrically coupled 210 to, and can be read by, address matching logic circuit 103, as well as limit check validation circuit 104. Register buffer 150 holds the target address received from the header of communication packet 350. Address matching logic circuit 103 is enabled to output 109 a port identifier, either a name or a number, associated with an address match found in a base address register in the array 101A-101H.

Base address registers 101A-101H, in the base address register array 101, are each electrically connected 106 to address matching logic circuit 103. Address matching logic circuit 103 is, in turn, electrically connected to limit check validation circuit 104. In this embodiment of the present invention, limit check validation circuit 104 is implemented logically as a multiplexer 203 and a comparator 201. Multiplexer 203 takes inputs 206 from address matching logic circuit 103. In this illustration, an input to multiplexer 203 is shown for each base address register in the base address register array 101. In this embodiment of the present invention, however, only one input is taken from address matching logic circuit 103 in each routing operation, that one input being the limit address associated with the matching base address selected by the base address matching logic circuit 103.

The output of multiplexer 203 is one input to comparator 201. The other input is, via connection 210, the communication packet target address held in buffer 150. Based on the comparison, in this case a "greater-than" comparison, a nullify signal is output 202 by comparator 201. In the present embodiment, the output is sent to switch core of the switching device. As illustrated here, the output is a nullification signal that is sent when the target address is greater than the limit address associated with the matching base address.

Continuing in reference to FIG. 2A, routing device 10 is illustrated as being implemented in a switching device with eight base address registers, in accordance with an embodiment of the present invention. A switching device with eight base address registers, it is noted, also has eight downstream ports. It is also noted that routing device 10 can be implemented in switching devices with different numbers of ports.

The base address registers in array 101 are each enabled to be read into base address matching logic circuit 103. In one embodiment the base address matching logic circuit 103 is a matching logic circuit as described in U.S. patent application Ser. No. 11/395,715, entitled "BINARY BASE ADDRESS SEARCH DEVICE AND METHOD", filed on Mar. 31, 2006, that is hereby incorporated by reference herein in its totality. Base address matching logic circuit 103 is enabled to locate the base address register whose contents include a base address equal to or smaller than the target address for which a match is sought.

It is noted here that a base address register, as referred to in this description, can include a limit address and a port name or number. When a matching base address is determined by the base address matching logic circuit, the associated port identifier is sent to the switch core of the switching device. The port name or number is used to forward the communication packet to the correct port.

It is also noted here that a switching device, such as the exemplary device with eight downstream ports, also has an upstream port. However, the handling of communication packets that are targeted upstream of the switching device is different than those destined downstream and, in discussing the embodiments described here, base address registers for the upstream port are not discussed.

Continuing in reference to FIG. 2A, each base address register 101A-101H of the array of base address registers 101, contains a base address, a limit address and a port identifier. A base address contained in a base address register is an address of an external device. The limit address, if different from the base address, is the ending address of the external device. The difference between the limit address and the base address is the address range of the device. If a base address register contains a limit address numerically smaller than the base address, the base address is considered to be an invalid address.

In the present embodiment, the content of the array of base address registers is sorted into a predetermined order. In this embodiment, the order is one of numerically decreasing base addresses so that the highest base address is contained the first base address registers 101A and the lowest base address is in bottom base address register 101H. However, it is understood that the use of any predetermined order of the content array of base address registers is within the scope of the present invention.

Figure 2B:
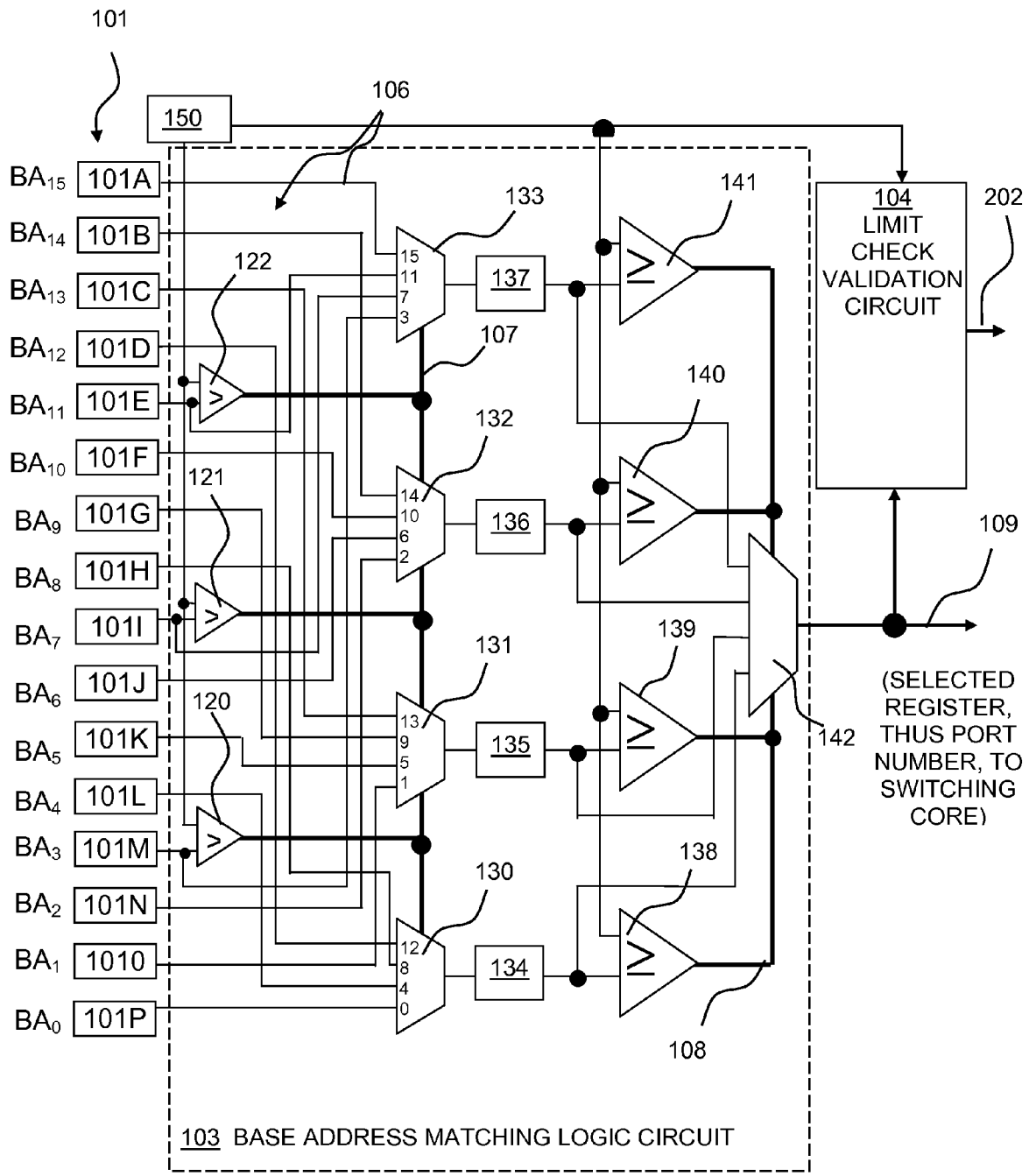
FIG. 2B illustrates a logic diagram of a base address matching logic element in a routing device in accordance with an embodiment of the present invention.

Now referring to FIG. 2B, base address matching logic circuit 103 and base address register array 101 are shown in a logical diagram. In this illustration, base address register array has sixteen base address registers 101A through 101P, containing base addresses $BA_{15}$ through $BA_0$, respectively. Base addresses $BA_{15}$ through $BA_0$ are sorted into the descending order in the array of base address registers 101.

It is noted here that the switching device, here illustrated with sixteen base address registers in each port's routing device, is a seventeen port switch, though embodiments of the present invention can be implemented in switching devices with any number of ports. The switch is implemented here with one upstream port and sixteen downstream ports. Again, because a communication packet whose header target address indicates routing through the upstream port is handled differently from other packets, the base address register holding address and port information associated with the upstream port is not shown in base address register array 101. Base address register array, in this illustration, contains sorted base address and port information for downstream ports.

It is noted that the base address designations $BA_0$, $BA_1$, etc through $BA_{15}$ are used herein to denote base address register contents that are sorted on the numerical value of the base address. These designations do not imply any specific values for base addresses, limit addresses, port names, or bus numbers.

Similarly, the number of illustrated base address registers in base address register array 101 is shown solely for the purpose of illustration. The specific number of base address registers used in implementations of embodiments of the present invention is dependent on the number of ports in the applicable switching device.

In FIG. 2B, the location of $BA_{15}$, the largest numerical value base address, is shown in the topmost, logically, base address register. This is to illustrate that embodiments of the present invention use an array of base addresses that are sorted. In this embodiment, the sorting is into a logically descending order. In another embodiment, another sort order is used.

Again referring to FIG. 2B, base address register array 101 is shown connected 106 to base address matching logic circuit 103. Base address register array 101 includes, as noted above, 16 base address registers whose contents are sorted in the decreasing order of base address from top to bottom as $BA_{15}$, $BA_{14}$, $BA_{13}$, ..., $BA_1$, $BA_0$. Base address register array 101 is, in this embodiment of the present invention, divided into 4 intervals each having 4 base address registers. More particularly, the first interval includes base address registers 101P through 101M, containing base addresses $BA_0$ to $BA_3$. The second interval begins with base address register 101L holding $BA_4$ and ends with 101I holding $BA_7$. The third interval begins with base address register 101H holding $BA_8$ and ends with base address register 101E holding $BA_{11}$. The fourth interval begins with base address register 101D holding $BA_{12}$ and ends with base address register 101A holding $BA_{15}$.

A first-phase in base address matching logic circuit 103 comprises a first-phase set of comparators, 120, 121, and 122. Each comparator is enabled to compare the contents of a specific base address register with a target address in a communication packet header. In this embodiment, the target address is held in register 150. Each comparator in the first-phase set is connected to and has one of its inputs from register 150 and takes the other input from one of the base address registers in base address register array 101. The specific register to which each comparator is connected is based on a specific intersection interval.

In one embodiment of the present invention, as illustrated in FIG. 2B, the number of registers in the base address register array 101 is used to determine the intersection interval. In this embodiment, the interval, in number of registers included, is determined by the square root of the total number of ports in the switching device, which determines the number of registers in the base address register array. In this embodiment, $N^{(1/2)}$ is 4, where N is the number of registers in the base address register array. This results in 3 ($N^{(1/2)}$−1) first-phase comparators.

In another embodiment, however, the number of registers defining the intersection interval is the result of taking $\log_2(N)$. In further discussion herein, "logarithm" can be inferred to designate any logarithmic function or root function used to determine the size of an intersection interval.

The topmost base address register in each interval, containing the numerically largest base address in the interval, is electrically coupled as one input to one of the first-phase comparators. More particularly, in the first interval base address register 101M, here having largest base address $BA_3$, is electrically connected to an input of first-phase comparator 120. In the second interval, base address register 101I, containing the interval's largest base address $BA_5$, is electrically connected to an input of first-phase comparator 121. In the third interval, base address register 101E, containing the interval's largest base address $BA_{11}$, is electrically connected to an input of first-phase comparator 122. Thus, the number of first-phase comparators is equal to the number of intervals minus 1. Accordingly, in general, there are $N^{(1/2)}$−1 first-phase comparators for array of base address registers 101, where, again, N equals the number of registers in the array.

It is noted here that embodiments of the present invention can be implemented in integrated circuits formed in silicon chips. The nature of such implementation lends some embodiments to seek optimal sizes of attendant features, such as multiplexers and comparators. In an embodiment discussed herein, one optimal size of a multiplexer can be found at four inputs. Hence, in one embodiment of the present invention, the number of selector phases and comparators can be derived from a root function that results in multiplexers of four inputs. In another embodiment, as noted above, other functions can be used to derive a relationship between phases and features.

As discussed above, register 150, containing the target address of interest, is electrically connected to the other input of each comparator 120-122. First-phase comparators 120, 121, and 122 compare the target address, in register 150, to base addresses $BA_3$, $BA_7$, and $BA_{11}$, respectively. The output of each first-phase comparator 120-122 depends on whether the target address in register 150 is greater numerically than the respective address. In the present embodiment, each first-phase comparator issues a "true" output if the target address is greater than the associated base address in each first-phase comparator's connected base address register. In another embodiment, the comparators issue a "false" output if the target address is not greater than the respective base address. Still other embodiments produce differing combinations of target address/base address relationships in relation to true/false outputs.

Still referring to FIG. 2B, the outputs of first-phase comparators 120-122 control the input selection of second-phase multiplexers 130, 131, 132, and 133. Multiplexers 130-133 select the inputs to second-phase comparators 138, 139, 140, and 141.

Second-phase multiplexers 130-133 are, in this embodiment of the present invention, four-input multiplexers. Each input to each of the second-phase multiplexers is connected to a single base address register, one in each of the intervals discussed above. Specifically, in this embodiment of the present invention, second-phase multiplexer 130 takes its inputs from base address register 101P in the bottom-most interval, base address register 101L in the next interval, base address register 101H in the interval after that, and from 101D in the topmost interval. The next second-phase multiplexer 131 takes its inputs from the next set of base address registers; specifically, base address register 101O in the bottom-most interval, base address register 101K in the next interval, base address register 101G in the interval after that, and from 101C in the topmost interval. The next second-phase multiplexer 132 takes its inputs from the next set of base address registers; specifically, base address register 101N in the bottom-most interval, base address register 101J in the next interval, base address register 101F in the interval after that, and from 101B in the topmost interval. The topmost second-phase multiplexer 132 takes its inputs from the next set of base address registers; specifically, base address register 101M in the bottom-most interval, base address register 101I in the next interval, base address register 101E in the interval after that, and from 101A in the topmost interval.

In FIG. 2B, the outputs of first-phase comparators 120-122 are shown connected to a bus connecting second-phase multiplexers 130-133. The outputs of first-phase comparators 120-122 determine which of the inputs each second-phase multiplexer uses to compare with the contents of register 150. In FIG. 2B, each second-phase multiplexer is shown with indications of which base address is available on each input. Second-phase multiplexer 130, for example, is shown with 0, 4, 8, and 12, indicating that base addresses $BA_0$, $BA_4$, $BA_8$, and $BA_{12}$, respectively, are the base addresses to be read on each input. Second-phase multiplexer 131 has 1, 5, 9, and 13 to indicate that base addresses $BA_1$, $BA_5$, $BA_9$, and $BA_{13}$, respectively, are the base addresses to be read on each input. Similarly, second-phase multiplexer 132 has 2, 6, 10, and 14 to indicate base addresses $BA_2$, $BA_6$, $BA_{10}$, and $BA_{14}$, and second-phase multiplexer 133 has 3, 7, 11, and 15 to indicate base addresses $BA_3$, $BA_5$, $BA_{11}$, and $BA_{15}$.

In an example of operation of the first-phase comparators and the second-phase multiplexers, a communication packet arrives at a port with a target address $TA_{NEW}$ in its header that is numerically between the base addresses represented by $BA_8$ and $BA_9$. $TA_{NEW}$ is written into register 150. Each first-phase comparator 120, 121, and 122, compares $TA_{NEW}$ with each first-phase comparator's respective specific register. $TA_{NEW}$ is larger than $BA_8$, thus it is also larger than $BA_3$ in base address register 101M connected to first-phase comparator 120. First-phase comparator 120, therefore, outputs a "true" indication. $TA_{NEW}$ is also larger than $BA_7$ in base address register 101I connected to first-phase comparator 121, so first-phase comparator 121 also outputs a "true" indication. However, $TA_{NEW}$ is smaller than $BA_9$, so it is also smaller than $BA_{11}$ in base address register 101E connected to first-phase comparator 122, so first-phase comparator 122 outputs a "false" indication.

The combination of outputs from the first-phase comparators determines which input is accepted by the second-phase multiplexers 130-133. In this embodiment of the present invention, a true, true, false output from the first-phase comparators indicates that, if a matching address is to be found for the new target address $TA_{NEW}$, it will be found in the interval above base address register 101I; 101H up to and including base address register 101E. If the first-phase comparator output had been false, false, false, the first interval 101P-101M would have been indicated. If the output had been true, false, false, the second interval 101L-101I would have been indicated. If the output had been true, true, true, the topmost interval, 101D-101A would have been indicated.

Because, in this example, the third interval 101H ($BA_8$)-101E ($BA_{11}$) is indicated, the output of first-phase comparators 120-122 causes the second-phase multiplexers 130-133 to read from the inputs connected to base address registers in the indicated interval. Second-phase multiplexer 130 reads from its third input connected to base address register 101H ($BA_8$), second-phase multiplexer 131 reads from its third input connected to base address register 101G ($BA_9$), second-phase multiplexer 132 reads from its third input connected to base address register 101F ($BA_{10}$), and second-phase multiplexer 133 reads from its third input connected to base address register 101E ($BA_{11}$). The contents of each of the third interval registers is written to the buffers 134-137, connected to each output of the second-phase multiplexers 130-133, respectively.

It is noted again that the numbers of second-phase multiplexers, the number of second-phase comparators and the number of first phase comparators are determined by the number of registers in the base address register array. In this embodiment of the present invention, the number of second-phase multiplexers is the nearest integer of the square root of the number of registers in the array, $N^{(1/2)}$, where N is the number of registers. For example, if there are eight registers in a nine-port switch, the number of second-phase multiplexers in this embodiment would be 3. In a 32 port switch, the number of second-phase multiplexers in this embodiment of the present invention would be 6. The number of first-phase comparators is $N^{(1/2)}-1$, in this embodiment. In a switching device with a port count producing a non-integer square root of N, the number is the next higher integer.

Referring again to FIG. 2B, the outputs of second-phase multiplexers 130-133 are connected to buffers 134-137, respectively. Each buffer 134-137 is enabled to be read as an input to second-phase comparators 138-141, respectively. The other input to each second-phase comparator is connected so as to read register 150 which contains, in the current example, new target address $TA_{NEW}$. Second-phase comparators 138-141, it is noted, output a true indication on either a greater-than-or-equal-to comparison.

Continuing the current example, second-phase comparator 138 compares $TA_{NEW}$ with base address $BA_8$. Second-phase comparator 139 compares $TA_{NEW}$ with base address $BA_9$, second-phase comparator 140 compares $TA_{NEW}$ with base address $BA_{10}$, and second-phase comparator 141 compares $TA_{NEW}$ with base address $BA_{11}$. $TA_{NEW}$ is larger than $BA_8$ but smaller than $BA_9$, $BA_{10}$, and $BA_{11}$. Therefore, second-phase comparator 138 outputs a true, but second-phase comparators 139-141 output false indications. As in the first phase, the outputs of second-phase comparators 138-141 control the input selection of multiplexer 142.

As shown in FIG. 2B, multiplexer 142 is also a four-input multiplexer, taking its inputs from the buffers 134-137 that contain the outputs of second-phase multiplexers 130-133. Again, the outputs of second-phase comparators 138-141 control the input selection of multiplexer 142.

In the present example, the "true, false, false, false" output of second-phase comparators 138-141 cause multiplexer 142 to accept the contents of register 134 as input. Register 134, as discussed above, contains the contents of base address register 101H, which include base address $BA_8$. In this way, the contents of base address register 101H are output by base address matching logic element 103. In addition to $BA_8$, the contents of base address register 101H include a limit address and a port name or number.

Continuing the present example in reference to FIG. 2B, the limit address contained in base address register 101H is compared to target address $TA_{NEW}$. If the target address and its associated address range, if any, are encompassed by the limit address contained in base address register 101H, and thus output by multiplexer 142, then the match is determined to be valid and the communication packet is forwarded to the port associated with the base address in base address register 101H. If the match is not determined to be valid, the packet is processed as an invalid packet. It is noted here that, in an embodiment implemented in PCI Express, such processing conforms to rules in the PCI Express specification.

If, in the continuing example, the indications output by second-phase comparators 138-141 had been different, a different input to multiplexer 142 would have been read for forwarding to the switch core. A "true, true, false, false" indication would have caused the multiplexer 142 to read from buffer 135. A true, true, true, false" indication would have caused the multiplexer 142 to read the contents of buffer 136, and a "true, true, true, true" would have caused the multiplexer to read buffer 137.

It is noted here that the selection, in this embodiment of the present invention, of the square root of the number of ports in the switching device results in a certain number of first-phase comparators, second-phase multiplexers, and second-phase comparators. Because multiplexers require less chip space, or real estate, than comparators, embodiments of the present invention are implemented in devices for which other choices produce differing numbers of such elements as may be optimal for the application. In a PCI Express switch having three downstream ports, for example, the next integer higher than $N^{(1/2)}$, (N=3) is 2. In the example discussed in reference to FIG. 2B, the selection of 2 as the interval integer would result in one first-phase comparator, two second-phase multiplexers and two second-phase comparators, as well as a base address sorting device and limit check validation, in lieu of six comparators if all base address registers were to be compared simultaneously.

However, in a large port-count switch, such as the exemplary switch with sixteen downstream ports, using $N^{(1/2)}$ (N=16) results in an interval size of four. This choice of interval size results in three first-phase comparators, four second-phase multiplexers, four second-phase comparators, and a base address sorting device in lieu of 32 comparators.

It is noted that other bases of reduction can be chosen for implementation of embodiments of the present invention, resulting in other numbers of elements of the base address matching device. For example, the integer closest to the square root of the number of registers can be utilized. In the case of a port with sixteen downstream ports, as is illustrated in FIG. 2A, the square root is 4, again resulting in three first-phase comparators and four second-phase comparators. In a switching device with 32 downstream ports, however, the integer that is next higher of the square root of about 5.66 is 6. An interval of 6 results in five first-phase comparators and six second-phase comparators.

Embodiments of the present invention are not limited, however, to a two-phase selection of base address matches. In one embodiment of the present invention, implemented in a switching device with 64 downstream ports, a three-phase matching address selection is implemented using a cube root function to establish the number of comparators in each phase. The number of registers in the intersection interval is the number of registers divided by the cube root of 64, 4. This results in three comparators in the first phase, four second-phase comparators, and four third-phase comparators.

The number of devices employed, however, do not limit embodiments of the present invention. Embodiments of the present invention encompass the scheme of base address sorting in order to enable multiphase comparisons as discussed in the above discussion.

Figure 3:
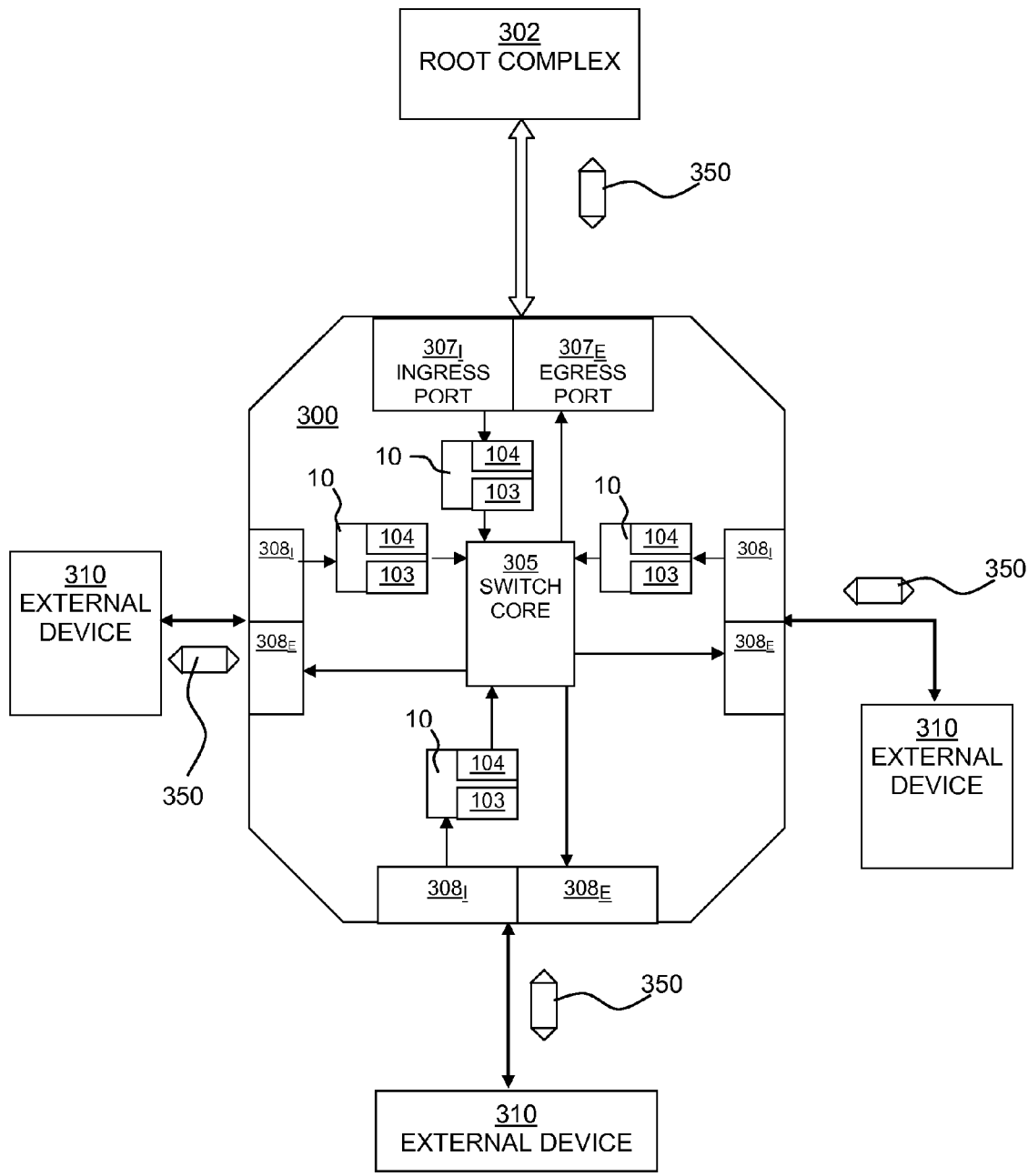
FIG. 3 illustrates a block diagram of a switching device in accordance with an embodiment of the present invention.

Now referring to FIG. 3, a block diagram of a switching device 300 is shown. In this embodiment of the present invention, the switching device uses routing device 10 of FIG. 1 at each port to facilitate communication of the external devices 310 connected to the switch. In another embodiment, routing device 305 is centrally implemented with switch core 305.

In one embodiment of the present invention, switching device 300 is a PCI Express switch. Switching device 300 employs routing device 10 that contains address matching logic device 103. Address matching logic device 103 is electrically connected to a switch core 305. Switching device 300 communicates with external devices 310 via PCI Express links 306. As discussed previously, the term PCI Express as used in the present invention includes devices, protocols, operations that conform to the requirements of the PCI Express Base Specification. The term "PCI Express Base Specification", as used in the present application, includes all PCI Express standards, including but not limited to PCI Express Standard versions 1.0, 1.0a, and 1.1 published by PCI Signal Interest Group (PCI-SIG).

In the present embodiment, as illustrated in FIG. 3, switching device 300 is implemented as a four port switch. In another embodiment, switching device 300 includes sixteen or more ports enabled to communicate with external devices 310. In one embodiment, switching device 300 includes 15 ports downstream ports 308 and an upstream port 307. Upstream port 307 further includes ingress terminal 307I and egress terminal 307E. Ingress terminal 307I is an input terminal for receiving an incoming PCI Express communication packet from root complex 302. Egress terminal 307E is an upstream output port for sending out a communication packet routed through switching device 300 to root complex 302 or to another switching device located upstream.

Downstream ports 308 each include an ingress terminal 308I and an egress terminal 308E that are electrically coupled to switch core 305. Downstream ingress terminal 308I is used to receive communication packet 350 from external devices 310 and downstream egress terminals 308E send out communication packets to external devices 310. It is noted that, when external devices 310 are electrically connected to switching device 300, external devices 310 can send and receive PCI Express packets, through switching device 300 over PCI Express links 306, to each other without entailing upstream, root complex, time. At upstream port 307, the input terminal of routing device 10 is electrically connected to upstream ingress terminal 307I and the output terminal of routing device 10 is electrically connected to switch core 305. The output of the switch is electrically connected to egress terminal 307E of upstream port 307. Similarly, at each downstream port 308, the input terminal of routing device 10 is electrically connected to downstream ingress terminal 308I and the output terminal of routing device 10 is electrically connected to a switch of switch core 305. The output of that switch is electrically connected to egress terminal 308E of downstream port 308.

In one embodiment of the present invention, routing device 10, and its array of base address registers and control logic, is replicated at every port in switching device 300. In an alternative embodiment, however, a single implementation of the elements of routing device 10 is located with the switch core 305. In another embodiment, more than one implementation of the elements of routing device 10 is implemented, though not at every port in the switching device.

Referring still to FIG. 3, a communication packet 350 may be received at switching device 300 at upstream port 307 or at any of downstream ports 308. In the present embodiment, a communication packet 350 can be a data or other packet that is in compliance with the PCI Express standard. External devices 310 can be PCI Express devices or bridges to other types of devices. Upon receiving communication packet 350, control logic circuitry 105 determines whether the target address contained in communication packet 350 falls within the address range contained in any of the base address registers in the array of base address registers 101. If the target address contained in communication packet 350 is within the range of array of any of the base address registers 101, switching device 300 will forward the communication packet 350 to the port named in the base address register whose address range encompasses the target address.

In the present embodiment, switching device 300 is a single Integrated Circuit (IC) device that is implemented in a single semiconductor chip on which routing functions and logic of switching device 300 are implemented. This includes registers, comparators multiplexers and connection links described above. In practice, switching device 300 with base address matching logic element 103 can be implemented as a chipset which is a device coupled to a Central Processing Unit (CPU) to perform the desired system functionality. In another embodiment, switching device 300 can be implemented on an Application Specific Integrated Circuit (ASIC).

Figure 4:
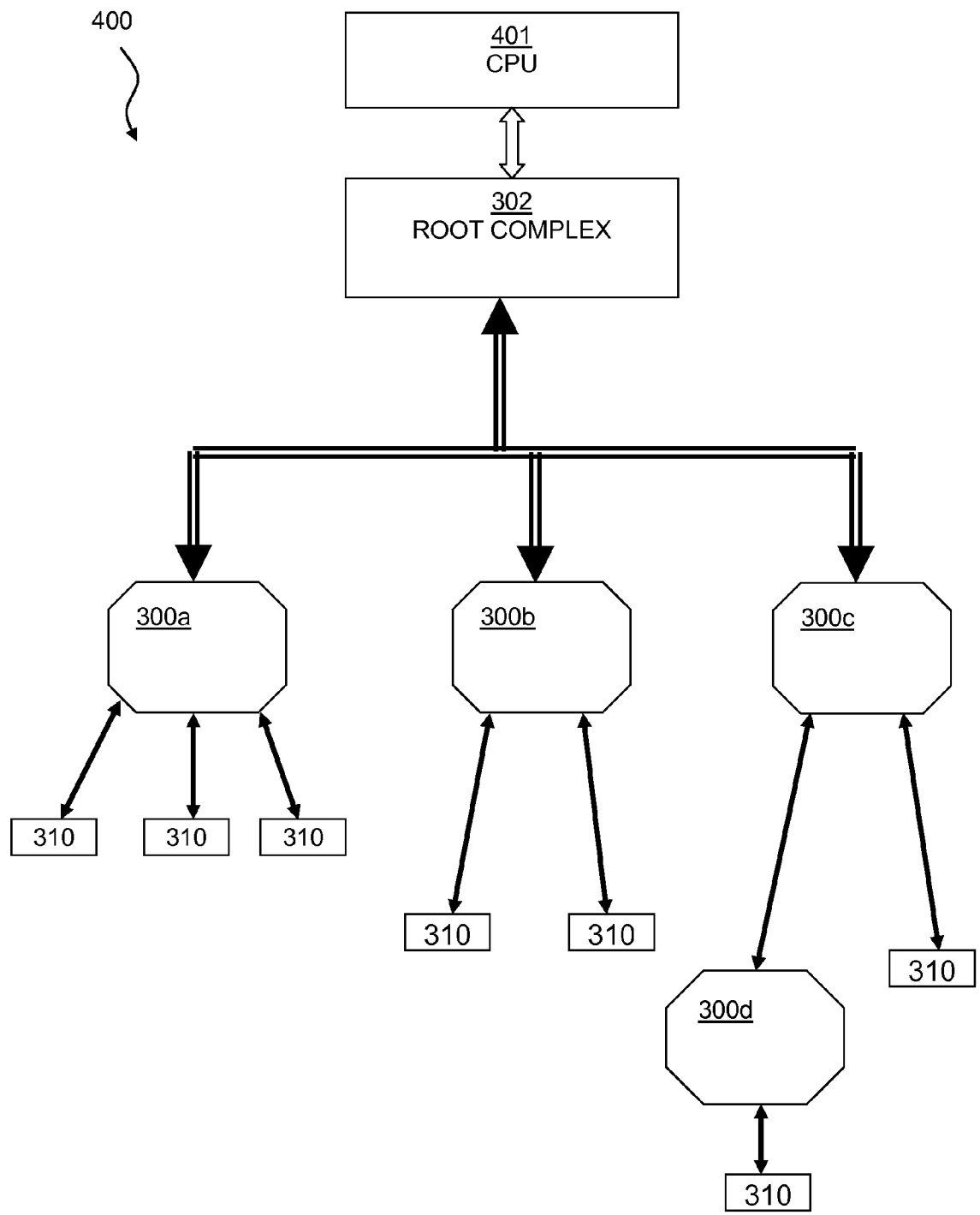
FIG. 4 illustrates a schematic diagram of a PCI Express system that includes the switching device of FIG. 3 and external devices in accordance with one embodiment of the present invention.

Now referring to FIG. 4, a schematic diagram of a typical PCI Express system 400 is shown that uses switching device 300 to connect external devices 310 with root complex 302 and with each other. Switching device 300 includes a routing device 10 that contains base address register array 101 and address matching device 103. In the embodiment that is shown in FIG. 4, switching device 300 with routing device 10 is implemented in a PCI Express system 400. PCI Express system 400 is a communication system which is typically found in computing system that includes a Central Processing Unit (CPU) 401, a root complex 302, switching device 300 and one or more external devices 310.

The elements of PCI Express system 400 interconnected by PCI Express link 306 are the root complex 302, the switching device 300, and the external devices 310. CPU 401 is electronically connected to root complex 302 but the link between them is not, in this embodiment, a PCI Express link. The heart of PCI Express system 400 is root complex 302. Root complex 302 is connected to PCI Express switching device 300 by PCI Express link 306. External devices 310 communicate to root complex 302, and thus CPU 401, via switching device 300. In PCI Express system 400, external devices 310 can independently communicate peer-to-peer with each other directly via switching device 300. PCI Express system 400 uses communication packets 350 to communicate to root complex 302, switching device 300, and external devices 310 connected thereto. Communication packets can be generated by the root complex 302, switching device 300, or external devices 310.

Referring further to FIG. 4, the controller of PCI Express communications in system 400 is either CPU 401 or root complex 302. In the point-to-point diagram shown in FIG. 4, CPU 401 can communicate to any of the external devices 310, even if the communication pathway between CPU 401 and an external device 310 includes PCI Express serial switch 300c and PCI Express serial switch 300d in the sequential relationship shown. CPU 401 can open up communication with that external device 310 via switching devices 300. CPU 401, through root complex 302, controls the operations of switching devices 300 and the PCI Express link 306 with external devices 310. Root complex 302 detects and initializes external devices 310, and controls PCI Express link 306 by default. Root complex 302 can retrieve information from external device 310. Upon receiving an instruction from root complex 302, switching devices 300 can route communications directly between external devices 310. External devices 310 can communicate with one another independently and in a peer-to-peer fashion without a master-slave control of either switching devices 300 or root complex 302.

External devices 310, it is noted, can be either endpoint devices or other switching devices such as switching devices 300, such as shown by switching devices 300c and 300d. Endpoint devices can be, for example, printers, digital cameras, add-in cards, USB memory sticks, etc. Other switching devices 300 are often not the end users of communication packets 350 sent to them; they forward the packets to other endpoint devices 310 to which they are connected. As discussed at length above, each external device 310 is assigned to a base address and a limit address. These base addresses are loaded and stored in a global address map and are retrieved as needed by root complex 302 or CPU 401. Root complex 302 then maps these base addresses to the arrays of base address registers 101. The base address contained in each base address register in the arrays of base address registers 101 defines the starting point and memory addresses that each external device 310 has been allocated in the global address map.

Referring again to FIG. 4, the purpose of PCI Express link 306 is to connect external devices 310 to root complex 302 so that the CPU 401, via root complex 302, can communicate with them. Each PCI Express link 306 is composed of one or more lanes, and each lane is capable of transmitting packets in both directions at once. This full-duplex communication is possible because each lane is itself composed of one pair of signals: send and receive.

Referring again to FIG. 4, upon power-up and enumeration process, the operating system, via root complex 302, interrogates the entire PCI Express system 400 by traversing through system topology and locates all external devices 310 that are connected to the switching device 300. After the configuration process is complete, each receiver interface of each external device 310 is prepared to monitor the integrity of new communication packet 350. A transaction layer packet (TLP) can move from one PCI Express link 306 to another PCI Express link 306, using routing information contained in its header.

Referring again to FIG. 4, as a new communication packet 350, in the form of a transaction layer packet (TLP), arrives at ports 307 or 308, switching device 300 checks for errors then determines whether to accept the traffic and use it internally, forward the traffic to the appropriate port 308, or reject the traffic because switching device 300 is neither the intended target nor an interface to it.

Figure 5:
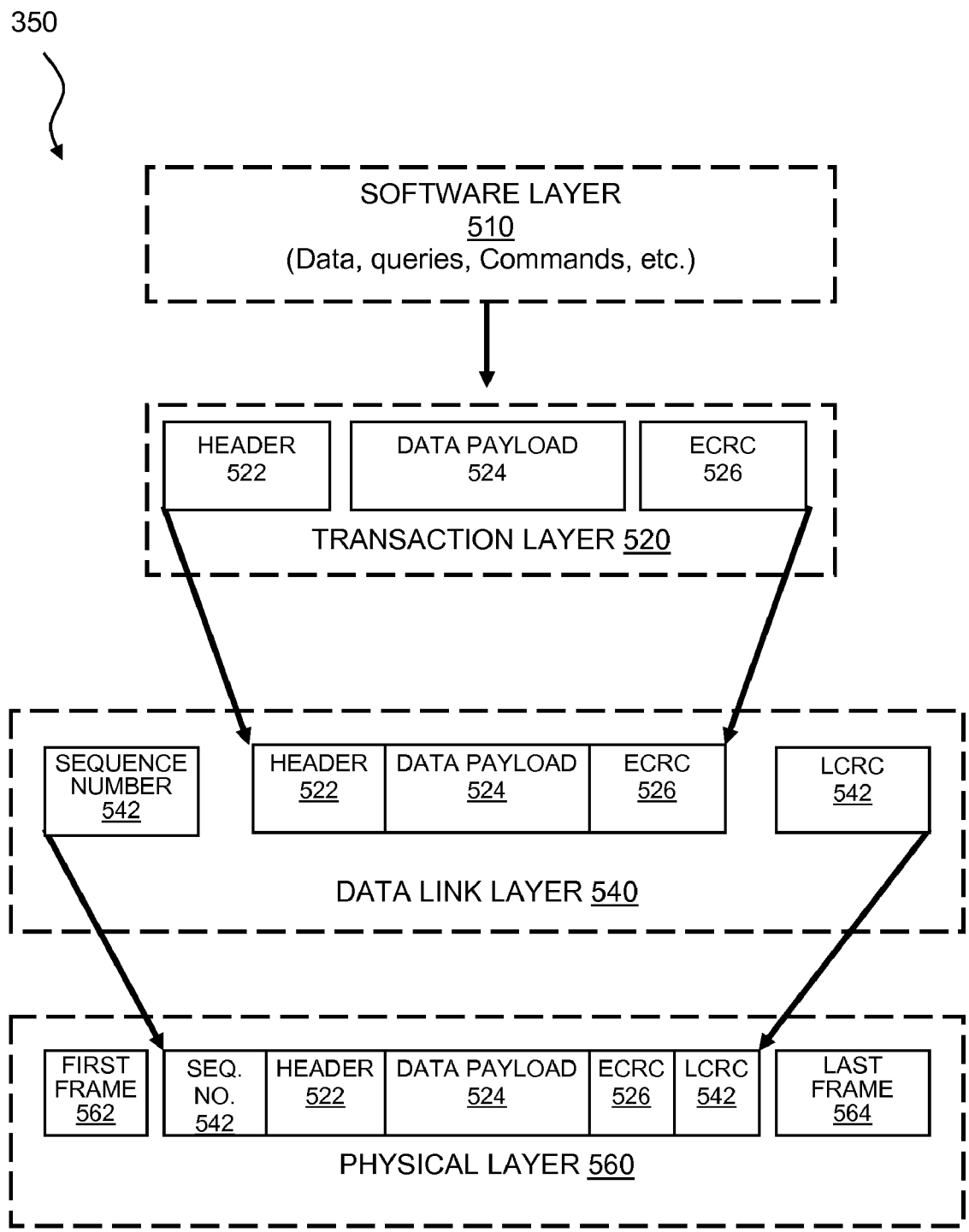
FIG. 5 illustrates a conceptual parsing of a communication packet in a PCI Express system in accordance with an embodiment of the present invention.

Referring now to FIG. 5, different abstract layers of a typical PCI Express communication packet 350 are illustrated. Communication packet 350 can include data, commands, a query or other communication that a software function, software layer 510 in this illustration, intends for some device in the system. A configuration command, reassigning base and limit addresses, it is noted, can be one type of communication packet 350. Data becomes the payload 524 of a data packet. In a configuration command, the payload is a new address or set of addresses for reconfiguration of a base address register in switching device 300.

Referring still to FIG. 5, a transaction layer 520, the operating system for example, applies a header 522 and, possibly, a footer 526, to the data payload 524. Header 522 includes a target address which can be a device address, a port name, or a bus number in the system. In the example of a configuration command packet, the target address is an address internal to switching device 400. Footer 526 is often an End-to-end Cycle Redundancy Checking (ECRC) sequence.

Transaction layer 520 ensures that communication packet 350 is properly routed to its intended destination and that it arrives intact. In the example of a communication packet 350 destined for an external device 310, transaction layer 520 ensures the integrity of communication packet 350 and that it passes intact through switching device 300.

Data link layer 540 is, in this embodiment, the point-to-point function, such as is implemented by switching device 300. The data link layer adds sequence number 542 and a Link Cycle Redundancy Check (LCRC) 546 to the communications packet. Physical layer 560 represents the transmission medium which is responsible for actually transmitting and receiving communication packet 350 across PCI Express link 306. Physical layer 560 adds a first frame 562 and a last frame 564 in addition to sequence number 542, LCRC 546, header 522, data payload 524, and ECRC 526. Link cyclical redundancy check (LCRC) 546 ensures integrity of packet 350 across PCI Express link 306.

It is noted that a switching device in a PCI Express environment can be connected with one or more switching devices at its downstream ports, as shown in FIG. 4, above. If, in this example, the target address of a communication packet 350 indicates a downstream external device and switching device 350 is not the recipient, switching device 300 forwards communication packet 350 to the downstream external device 310. A base address register associated with a downstream switch, it is noted, contains a base address and a limit address fully encompassing the ranges of addresses represented in the base address registers of the downstream switch.

If switching device 300 is not correctly in the path of communication packet 350, the packet is returned to the upstream egress terminal 307E subject to the rules for ordering and flow control for that port. If the target address contained in the header 522 of transaction layer packet 520 does not belong to the range of base addresses of upstream port 407, switching device 400 performs further comparisons and rejects the packet as an Unsupported Request (UR). Thus, transaction layer 540 and other layers carry information and ensure data integrity of communication packet 350 that is necessary to perform the routing process of routing device 10 in switching device 300.

In one embodiment of the present invention where PCI Express system 300 has more than one switching device 300 connected to it, to facilitate communications between two external devices 310 in different switching devices 300, communication packet 350 traverses from the originating external device 310, connected to one switching device 300 all the way up to the lowest common switch point. New communication packet 350 is then traverses down to the destination external device 310. When the source and target reside on different segments of PCI Express link 306, communication packet 350 must be routed up toward root complex 302 to the segment of PCI Express link 306 where the base address ranges of the source and the target external devices 310 intersect, and then routed down to the target external device 310. As a result, address based routing exploits the shortest paths that exist in a switched-packet interconnect fabric.

Figure 6:
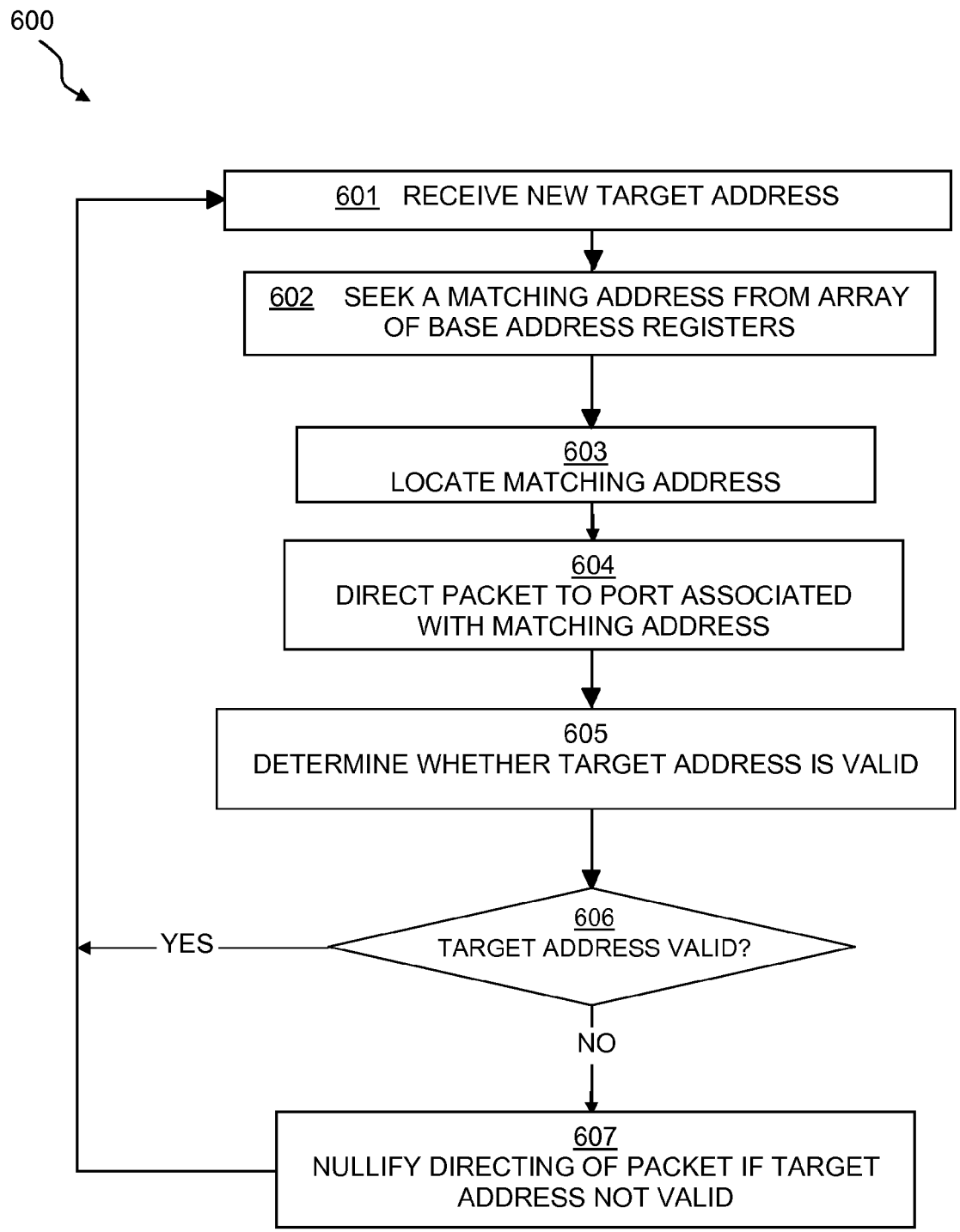
FIG. 6 illustrates a flow diagram of a method for post matching limit check validation in a switching device in accordance with an embodiment of the present invention.

FIG. 6 illustrates a method for rapid binary base address search with post match limit check validation in accordance with an embodiment of the present invention. Method 600, implemented by routing device 10 in switching device 300, begins by receiving a communication packet 350 containing a new target address, 601. The target address can be a memory address, a pre-fetchable memory address or an I/O address, or a bus or device or function number. The new target address is received and held in a register/buffer 150.

A matching address is sought for the new target address in a set of sorted base addresses in an array of base address registers 602. This seeking is a "less-than-or-equal-to" search meaning that, in this embodiment of the present invention, the largest base address that is less than or equal to the target address is the matching address. In another embodiment, a matching address search is based on a greater-than searching through the array of sorted base addresses. The sorting of base addresses, it is noted again, is disclosed and described in detail in co-pending patent application IDT-2061, as related previously.

When a matching base address is located 603, the port identifier associated with the base address is transmitted to the switch core 305 of the switching device 300. The limit address associated with the matching base address is also noted and sent the limit check validation circuit 104. In this embodiment of the present invention, the limit address is selected from the appropriate base address register by multiplexer 203 which has an input from each base address register. The input selection is directed by the base address register selection made for sending the port identifier to the switch core. The limit address that is associated with the selected port is the one sent by multiplexer 203 to comparator 201.

With the port identifier, switch core 305 is able to direct 604 the communication packet to the port associated with the matching base address. The port identifier can be a number, a port name, or a bus number associated with the port.

In step 605, the limit check validation circuit 104 determines if the target address or the matching address are valid addresses for directing the routing of the communication packet. At step 603, above, the limit address is sent to the limit check validation circuit. There, the target address is compared, in comparator 201 in this embodiment, to the limit address associated with the matching base address found in step 603.

In step 606, if the target address is not greater than the limit address in the limit check validation circuit 104, no action is taken by the limit check validation circuit 104. The communication packet in consideration, in this instance, is routed as addressed.

If, however, the target address is greater 606 than the limit address associated with the matching base address found in step 603 above, the limit check validation circuit 104 outputs a "true". The true is a nullification signal in that it means that the target address in consideration is outside the address range of the external device connected to the port associated with the matching base address. It is noted here that a limit address can be identical to a base address or, in some cases, less than an associated base address.

In this case, where the target address is greater than the limit address associated with the matching base address, the packet is processed as an invalid packet and its routing nullified 607. The switching device is then ready to receive another packet.

A device and method have been disclosed herein for performing a limit address check validation in a switching device. The device includes a data selector circuit that is enabled to select the content of an address register in an array of address registers, and a comparator electrically coupled to the data selector circuit and enabled to take a first input from the data selector circuit and target address as a second input from a communication packet. The method includes receiving the target address, seeking and locating a matching address in an array of base address registers, directing the packet to the port associated with the matching address, determining the target address to be a valid address by comparing the target address with a limit address associated with the matching base address, and nullifying the match if the target address is greater than the limit address.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A limit address check validation device in a communication packet switching device, the communication packet switching device comprising a switch core and an array of base address registers, each base address register in the array of base address registers comprising a base address, a limit address and a port identifier and the communication packet comprising a target address indicating a port, the limit address check validation device comprising:
   a data selector circuit to select a limit address associated with a matching base address register in the array of base address registers; and
   a comparator electrically coupled to the data selector circuit, the comparator to compare the target address of the communication packet to the selected limit address to determine if the target address is a valid address, the comparison performed after the communication packet has been routed to the port identifier of the switch core associated with the matching base address register, and upon comparison, if it is determined that the target address of the communication packet is not a valid address, the comparator to nullify the routing of the communication packet.

2. The limit address check validation device described in claim 1, further comprising a buffer for storing the limit address contained in the matching base address register wherein the buffer is electrically coupled to the array of base address registers.

3. The limit address check validation device described in claim 1, wherein the data selector circuit is a multiplexer.

4. The limit address check validation device described in claim 1, wherein the base address registers in the array of base address registers are sorted in a descending order.

5. The limit address check validation device described in claim 4, wherein, the matching base address register is identified as the largest base address that is less than or equal to the target address of the communication packet.

6. The limit address check validation device described in claim 1, wherein the data selector circuit selects the limit address based on the matching base address register output provided by an address matching device in the switching device.

7. The limit address check validation device described in claim 1, wherein the data selector circuit receives an input from each of the base address registers in the array of base address registers.

8. The limit address check validation device described in claim 1, wherein the communication packet is routed to the port associated with the matching base address register by routing the port identifier associated with the matching base address register to the switch core.

9. The limit address check validation device described in claim 1, wherein it is determined that the target address of the communication packet is not a valid address when the target address is determined to be greater than the limit address associated with the matching base address register.

10. A switching device for switching a communication packet, comprising:
- a switch core enabled to direct the routing of the communication packet;
- a plurality of communication ports, each of the communication ports electronically coupled to the switch core and to an external electronic device, each of the ports associated with a base address and a limit address and a port identifier;
- an array of base address registers, wherein content in the array of base address registers includes the base address and the limit address and the port identifier;
- a base address matching logic circuit to select a matching base address register in the array of base address registers and to route the communication packet to the port identified by the port identifier associated with the matching base address register;
- a limit check validation circuit for comparing a selected limit address associated with the matching base address selected by the base address matching logic circuit to a target address in the communication packet, said limit check validation circuit to compare the target address to the selected limit address to determine if the target address is a valid address, the comparison performed after the communication packet has been routed to the port identified by the port identifier associated with the matching base register, and upon comparison, if it is determined that the target address of the communication packet is not a valid address, the limit check validation circuit to nullify the routing of the communication packet.

11. The switching device described in claim 10, wherein the limit check validation circuit is enabled to transmit a nullify signal to the switch core if the target address is greater than the selected limit address.

12. The switching device described in claim 10, wherein the communication packet is a PCI Express packet.

13. The switching device described in claim 10 wherein the switching device is a serial switch.

14. In a switching device, a method for address matching, comprising:
- receiving a target address in a communication packet;
- seeking a matching address from a set of sorted base addresses in an array of base address registers, each base address register associated with a port in the switching device;
- locating the matching address in the array of base address registers;
- directing the communication packet to a port associated with the matching address;
- determining whether the target address is a valid address after the communication packet has been directed to the port associated with the matching address; and
- nullifying the directing of the communication packet if the target address is not a valid address.

15. The method for address matching described in claim 14, wherein locating the matching address in the array of base address registers comprises selecting the numerically largest base address, in the set of sorted base addresses, that is numerically less than or equal to the target address.

16. The method for address matching described in claim 14, wherein determining whether the target address is a valid address comprises comparing the target address in the communication packet with the selected limit address associated with the matching address.

17. The method for address matching described in claim 14 wherein the switching device is implemented in a system conforming to PCI Express standards.

18. The switching device described in claim 10, wherein it is determined that the target address of the communication packet is not a valid address when the target address of the communication packet is determined to be greater than the selected limit address associated with the matching base address register.

* * * * *

UNITED STATES PATENT AND TRADEMARK OFFICE
CERTIFICATE OF CORRECTION

PATENT NO. : 7,779,197 B1  Page 1 of 1
APPLICATION NO. : 11/382475
DATED : August 17, 2010
INVENTOR(S) : Christopher I. W. Norrie and Lambert Fong It is certified that error appears in the above-identified patent and that said Letters Patent is hereby corrected as shown below:

IN THE SPECIFICATIONS:

Column 8, Line 53, "$BA_S$" should read --$BA_7$--.

Signed and Sealed this
Twenty-eighth Day of February, 2012

David J. Kappos
*Director of the United States Patent and Trademark Office*